United States Patent
Stevenson et al.

(10) Patent No.: US 7,446,146 B2
(45) Date of Patent: *Nov. 4, 2008

(54) POLYETHYLENE LOW TEMPERATURE CAULKING COMPOSITION

(75) Inventors: Michael J. Stevenson, 460 Little Scout, Sedona, AZ (US) 86336; Robert A. Reeves, Cottonwood, AZ (US)

(73) Assignee: Michael J. Stevenson, Sedona, AZ (US)

( * ) Notice: Subject to any disclaimer, the term of this patent is extended or adjusted under 35 U.S.C. 154(b) by 153 days.

This patent is subject to a terminal disclaimer.

(21) Appl. No.: 10/947,780

(22) Filed: Sep. 23, 2004

(65) Prior Publication Data

US 2005/0038169 A1    Feb. 17, 2005

Related U.S. Application Data

(63) Continuation-in-part of application No. 10/002,590, filed on Dec. 5, 2001, now Pat. No. 6,852,788.

(51) Int. Cl.
*C08K 5/01* (2006.01)

(52) U.S. Cl. ...................................... 524/474; 524/476

(58) Field of Classification Search .................. 524/474
See application file for complete search history.

(56) References Cited

U.S. PATENT DOCUMENTS

| | | |
|---|---|---|
| 2,628,172 A | 2/1953 | Jenett |
| 3,189,573 A | 6/1965 | Oken |
| 4,237,037 A | 12/1980 | Takahashi |
| 4,260,439 A | 4/1981 | Speer |
| 4,925,880 A | 5/1990 | Stein |
| 5,726,239 A | 3/1998 | Maes et al. |
| 5,746,961 A | 5/1998 | Stevenson |
| 6,287,405 B1 | 9/2001 | Stevenson |
| 6,852,788 B2 * | 2/2005 | Stevenson et al. ............ 524/474 |

FOREIGN PATENT DOCUMENTS

EP    A 0733677    9/1996

* cited by examiner

*Primary Examiner*—Edward J Cain
(74) *Attorney, Agent, or Firm*—Robert E Strauss

(57) ABSTRACT

The polyethylene caulking composition of the invention is a mixture of a carrier and binder component and polyethylene powder. The carrier and binder component is a liquid hydrocarbon oil. The polymer is finely subdivided polyethylene, preferably ultra high molecular weight, having a low melt index, no greater than 30. The composition is thixotropic with a consistency of toothpaste, typically having a stirred viscosity up to 30,000 centipoise at ambient temperature, which is suitable for use as a caulking composition.

The caulking composition of the invention can be extruded at low pressures through a caulking gun or from a squeeze tube to plug vent holes or perforations in molded, hollow-form polyethylene parts, or applied as a caulk onto the flange surfaces of rotational molds.

13 Claims, No Drawings

POLYETHYLENE LOW TEMPERATURE CAULKING COMPOSITION

RELATIONSHIP TO OTHER APPLICATIONS

This application is a continuation-in-part of our application Ser. No. 10/002,590, filed Dec. 5, 2001, now U.S. Pat. No. 6,852,788.

BACKGROUND OF THE INVENTION

1. Field of Invention

This invention relates to polyethylene-containing resins, in particular to a caulking composition and to methods of its use.

2. Brief Statement of the Prior Art

Molded polyethylene parts frequently require repair or modification after their manufacture. As an example, large, hollow-form parts which are manufactured by rotational molding are formed with vent holes to permit escape of vapors during the molding cycle and these vents must be closed after the part has been formed. Instances of repair occur when a part, such as a tank, has been damaged by a crease or perforation in its wall. Polyethylene surfaces, however, reject most adhesives and the repair and modification of molded polyethylene parts is commonly practiced with flame or high temperature plastic welding, which often weakens or damages the parts.

Rotational molding is commonly used to manufacture hollow-form plastic parts such as outdoor signs, tanks and containers using molds which are subjected to repeated thermal cycling and heavy usage which frequently distorts the sealing flanges of the molds, causing them to fail to seal tightly, resulting in loss of resin through cracks in the parting line of the mold.

In our copending parent application, we disclose and claim a polyethylene composition having the consistency of putty which has found use as a sealant for the parting lines of molds used in rotational molding and as a plug which can be fused into molded arts to close holes or perforations in the walls of molded polyethylene parts. This product, however, has a solid consistency which resists extrusion, particularly at ambient temperatures.

OBJECTIVES OF THE INVENTION

It is an objective of this invention to provide a polyethylene molding composition which can be easily extruded from a caulk gun or squeeze tube.

It is an additional objective of this invention to provide a polyethylene-containing, molding composition which can be extruded at low temperatures and low pressures.

It is a further objective of this invention to utilize the aforementioned molding composition to seal parting lines of molds used in rotational molding.

It is a further objective of this invention to provide a low-temperature, liquid phase injection molding process using the molding composition of this invention.

Other and related objectives will be apparent from the following description of the invention.

BRIEF DESCRIPTION OF THE INVENTION

The polyethylene caulking composition of the invention is a mixture of a carrier and binder component and polyethylene powder. The carrier and binder component is a liquid hydrocarbon oil. The polymer is finely subdivided polyethylene, preferably ultra high molecular weight, having a low melt index, no greater than 30. The composition is thixotropic with a consistency of toothpaste, typically having a stirred viscosity up to 30,000 centipoise at ambient temperature, which is suitable for use as a caulking composition.

The caulking composition of the invention can be extruded at low pressures through a caulking gun or from a squeeze tube to plug vent holes or perforations in molded, hollow-form polyethylene parts, or applied as a caulk onto the flange surfaces of rotational molds.

DESCRIPTION OF PREFERRED EMBODIMENTS

The caulking composition of the invention is a mixture of a polyethylene component and a carrier and binder component. The amount of the carrier and binder component used in the caulking composition can be varied, depending on the application. Since the carrier and binder component will lessen the physical properties of the polyethylene component, it is desirable to use the least amount of carrier and binder component which is compatible with the intended method of application. For most applications, the liquid carrier and binder component is used in amounts from 40 to 60 weight percent and the polyethylene component is used in amounts from 60 to 40 weight percent.

The polyethylene component can be entirely finely subdivided polyethylene of ultra high molecular weight or can contain up to about 70 weight percent of low to high density polyethylene. A preferred, general purpose blend is from 33 to 67 percent ultra high molecular weight ($10-35 \times 10^6$ weight MW) polyethylene and 67 to 33 weight percent low to high density (0.91-0.98 g/cc) polyethylene. In applications where it is important that the molded product have high physical properties, e.g., high strength or toughness, it is preferred to use very high or ultra high molecular weight polyethylene for the entire polyethylene component. The polyethylene component should also have a particle size less than 40 mesh and should have a low melt index, less than 30, preferably less than 20.

The liquid hydrocarbon oil serves as a carrier and a binder for the polyethylene component and is used in an amount sufficient to provide the desired consistency at ambient temperatures, typically a stirred Brookfield viscosity no greater than 30,000, preferably no greater than 20,000 at a temperature from 65° to 95° F. This provides a consistency similar to that of toothpaste, which is suitable for extrusion from caulk guns or squeeze tubes.

Examples of suitable hydrocarbon oils include mineral oil, preferably white mineral oil, and paraffinic oils.

Examples of suitable mineral oils are highly refined, low volatility oils which are a blend of saturated aliphatic and alicyclic non-polar hydrocarbons having an average molecular weight from 500 to about 1500.

Useful paraffinic oils have 65 to 95 percent saturated hydrocarbons and from 6 to 30 percent aromatic compounds with a distillation range from about 500° to 1000° F.

In some applications, it is desirable to increase the tack or adhesive properties of the caulking compositions. In those applications, the liquid or semi-solid carrier and binder component can be compounded with a tackifier. The tackifier should have a softening temperature less than the melting temperature of the polyethylene particles, i.e., less than 250° F. Useful tackifiers include polyacrylic acid, polyacrylates, polyurethanes, poly(vinyl)acetate and mixtures thereof. These tackifiers can be used in concentrations from about 2 to about 5 weight percent of the composition.

In some applications the caulking or the molding composition can also be loaded with from 1 to 10 weight percent of reinforcement fibers such as chopped fibers of glass, carbon, polyester.

Other materials which can be included in the caulking or molding composition to form a cellular or foamed product include various chemical or physical foaming agents which are conventionally used in molding resins such as azodicarbonamide and actitoluenesulfonylsemicarbazide, and other proprietary endothermic and exothermic foaming agents. These foaming agents are used at the supplier's recommended concentrations, usually from 0.25 to about 5 weight percent of the caulking or molding composition.

Other optional ingredients which can be added include low amounts (from 1 to 5 weight percent) of synthetic elastomers such as styrene-isoprene block copolymers, polyisobutylene, etc. which provide elasticity to the caulking composition.

Other additives which can be included in amounts from 0.1 to 1 weight percent include ultraviolet light protectants such as hindered amines which are commonly used in polyethylene resins.

The materials which are used for the liquid or semi-solid carrier and binder component of the compositions or as additives should have a light color to avoid staining the molded product, and should have high heat and ultraviolet light stability and be soluble in hydrocarbon solvents.

Applications of the Caulking Composition

The caulking composition is particularly useful in rotational molding to seal the parting line of a worn or damaged mold. In this application, the caulking composition is extruded onto the sealing face of a mold in the region where a gap exists in the parting line of the mold. The caulking composition is applied with a thickness from 0.012 to 0.25 inch, depending on the dimensions of the gap between the sealing edges of the mold. Preferably, a parting agent is applied to the sealing face before application of the caulking composition. During the molding cycle, the caulking composition forms a gasket which prevents loss of molding resin from the interior of the mold. Preferably, the bead of the caulking composition is applied along the periphery of the mating flanges of the mold halves, avoiding the possibility that the caulking composition will merge into the molded part, to avoid the necessity to cosmetically repair the part in the event that the caulking composition does not have the same colorant as the base polymer. If the caulking composition merges into the part, it will become integral with the wall of the molded part and the ejected part will have some flashing which can be readily trimmed from its exterior surface.

The caulking composition can also be used for repair or modification of molded parts, such as tanks which have cracks or holes in the tank walls such as damaged, used parts or vent holes in newly molded parts. In these applications, the open area of the wall is closed with the caulking composition, using if necessary a fiberglass mat or cloth across the open area. The part wall surrounding the worked area is then heated to fuse the caulking composition into the wall of the part.

The caulking composition can be used to fuse separate molded polyethylene parts together by applying a bead of the composition along the mating surfaces of two parts, placing the parts together and then heating the mated surfaces and caulk sufficiently to fuse the caulk and mated surfaces together.

The heating of the caulking composition and treated surfaces of molded polyethylene parts can be accomplished using a suitable radiant source such as an open flame or a high temperature electrical heater, e.g., an infrared heater. The heating step is practiced to apply heat locally to the treated surface of the molded part sufficiently to fuse the molding composition into the wall of the molded part. This requires that the surface of the part and the caulking composition reach their melting point, a condition which is reached when the caulking composition and the treated surface appear to be clear of any cloudiness. For polyethylene parts, the melting temperature is typically from 250° to 300° F. Thereafter, the molded part is cooled to ambient temperature.

The fusion of the caulking composition into a surface of a molded polyethylene part can be accelerated by including from 1 to 5 weight percent carbon black in the caulking composition to increase adsorption of infrared radiation. If desired, a thermal conductor such as copper or aluminum powders or metal coated glass beads can be added in amounts from 3 to 20 weight percent of the ultra high molecular weight polyethylene to enhance curing of the caulking or molding composition. Alternatively, cross-linkable polyethylene powder could be used and admixed with a cross linking agent to achieve high strength of the molded product.

EXAMPLE 1

A caulking composition is prepared by blending together 45 weight parts of a hydrocarbon mineral oil and 55 weight parts of a polyethylene component formed of 67 parts ultra high molecular weight polyethylene and 33 parts high density polyethylene. Two parts by weight of fumed silica are added as a thickening agent and 2 parts by weight of Kraton rubber are added to improve the elasticity of the caulking composition.

EXAMPLE 2

The caulking composition is loaded into a caulk gun cylinder which is placed in a conventional caulking gun and is applied to a damaged, molded polyethylene tank. The tank has a crease in its sidewall which is perforated with a ⅜ inch hole. A fiberglass patch is placed over the hole and the caulking composition is extruded into the crease and over the fiberglass patch. The coated surface is then heated with an infrared heater which is played over the surface until the caulking composition and the coated surface reach a melt condition, observed when the coated surface changes from a glazed to a clear appearance. The heating is then discontinued and the surface is permitted to cool. After cooling the tank is inspected and the hole is found to have been sealed and the crease in the tank has been filled so that the damaged area has the same appearance as the remainder of the tank.

EXAMPLE 3

The caulking composition prepared in Example 2 is used to seal the mating flanges of a rotational mold. The mating flanges are slightly warped and fail to seat properly, leaving a gap of approximately ⅜ inch. The gap is filled by applying a mold release silicon along the warped portions of the flanges and then extruding beads of the caulking composition over the coated flanges using a conventional caulk gun. The mold is charged with polyethylene molding resin having a size range passing a 35 mesh screen and a conventional rotational molding cycle is performed. The parting line remains sealed throughout the molding operation, and none of the molding resin is lost through the parting line of the mold. At the regions where the mold was sealed with the molding composition, the ejected part has slight flashing which is readily removed and polished to obtain a part identical to that obtained from an undamaged mold.

The invention has been described with reference to the illustrated and presently preferred embodiment. It is not intended that the invention be unduly limited by this disclosure of the preferred embodiment. Instead, it is intended that the invention be defined by the means, and their obvious equivalents, set forth in the following claims.

What is claimed is:

1. A caulking composition consisting essentially of:
   a. from 55 to 85 weight percent of polyethylene particles having a melt index less than 30 and a particle size no greater than about 40 mesh; and
   b. a liquid hydrocarbon oil carrier and binder component selected from the group consisting of mineral oils, and paraffinic oils in an amount from from 15 to 45 weight percent, sufficient to provide a thixotropic composition with a stirred viscosity less than 30,000 centipoise at ambient temperature.

2. A caulking composition consisting essentially of:
   a. from 55 to 85 weight percent of a polyethylene component comprising a mixture of from 33 to 67 weight parts ultra high molecular weight polyethylene and from 67 to 33 weight parts high density polyethylene per 100 weight parts polyethylene component polyethylene particles having a melt index less than 30 and a particle size no greater than about 40 mesh; and
   b. a liquid hydrocarbon oil carrier and binder component selected from the group consisting of mineral oils, and paraffinic oils in an amount from from 15 to 45 weight percent, sufficient to provide a thixotropic composition with a stirred viscosity less than 30,000 centipoise at ambient temperature.

3. The caulking composition of claim 1 wherein said polyethylene comprises ultra high molecular weight polyethylene.

4. The caulking composition of claim 1, 2 or 3 having a stirred viscosity less than 20,000 centipoise at ambient temperature.

5. The caulking composition of claim 1, 2 or 3 having a melt index less than 20.

6. The caulking composition of claim 1, 2 or 3 wherein said hydrocarbon oil carrier and binder component is a aliphatic hydrocarbon C-5 petroleum resins having a Brookfield viscosity at ambient temperature from 15,000 to 45,000 centipoise and a molecular weight from 550 to about 900.

7. The caulking composition of claim 1, 2 or 3 wherein said hydrocarbon oil carrier and binder component is a blend of saturated aliphatic and alicyclic non-polar hydrocarbons having an average molecular weight from 500 to about 1500.

8. The caulking composition of claim 1, 2 or 3 wherein said hydrocarbon oil carrier and binder component is a paraffinic oil having 65 to 95 percent saturated hydrocarbons and from 6 to 30 percent aromatic compounds with a distillation range from about 500° to 1000° F.

9. The caulking composition of claim 1, 2 or 3 including from 2 to 5 weight percent of a tackifier selected from the group consisting of polyacrylic acid, polyacrylates, polyurethanes, poly(vinyl)acetate and mixtures thereof.

10. The caulking composition of claim 1, 2 or 3 including from 1 to 3 weight percent of a synthetic elastomer.

11. The method of rotational molding wherein hollow-form plastic parts are formed by charging polyethylene particles to a rotational mold comprising at least two mold parts having sealing faces which mate together on a parting line to form a closed internal mold cavity, closing and heating the mold to the molding temperature of the polyethylene while rotating the mold about its major and minor axes for a time sufficient to form the molded part, cooling the mold to a demolding temperature, opening the mold and ejecting the molded part and wherein the sealing faces of the mold mate with a separation gap along at least a portion of their sealing faces, the improvement which comprises:
   applying to said portion of the sealing faces of said mold parts prior to closing and heating the mold, the caulking composition of claim 1, 2 or 3 to close said gap when said mold is closed.

12. The method of repairing a structural void in a rotationally molded polyethylene part having an open area in the wall thereof which comprises:
   a. applying the caulking composition of claim 1, 2 or 3 to said wall to close said open area; and
   b. heating said caulking composition and the wall surrounding said caulking composition to a temperature of about 350 degrees F., sufficient to fuse said caulking composition into the wall of said part.

13. The method of claim 12 including the step of applying a fabric web over said open area and applying said caulking composition over said web.

* * * * *